S. V. DE BOLOTOFF.
SILENCER FOR INTERNAL COMBUSTION ENGINES.
APPLICATION FILED AUG. 17, 1920.
1,370,197.  Patented Mar. 1, 1921.
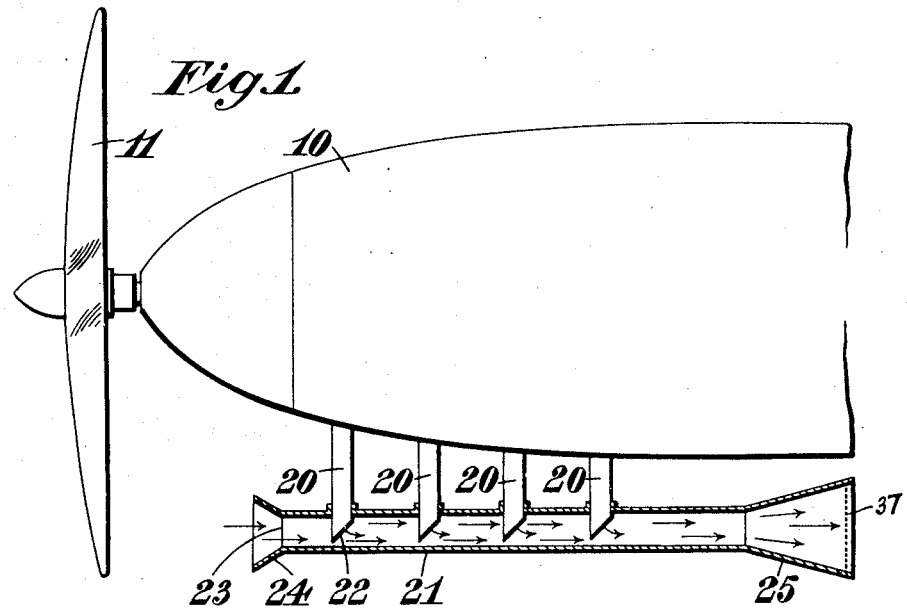
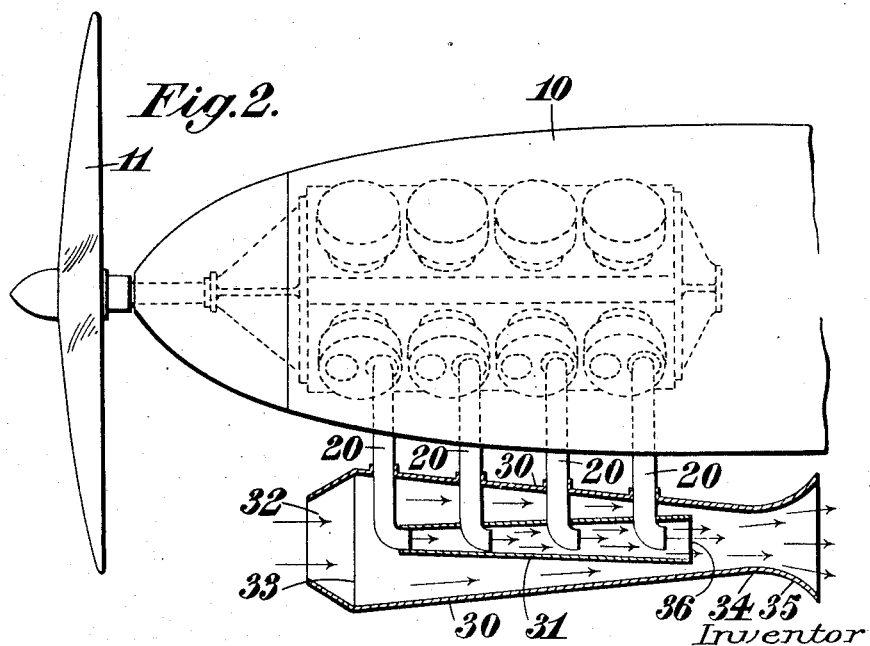

UNITED STATES PATENT OFFICE.

SERGE VINCENT DE BOLOTOFF, OF SEVENOAKS, ENGLAND.

SILENCER FOR INTERNAL-COMBUSTION ENGINES.

1,370,197. Specification of Letters Patent. Patented Mar. 1, 1921.

Application filed August 17, 1920. Serial No. 404,228.

*To all whom it may concern:*

Be it known that I, SERGE VINCENT DE BOLOTOFF, a Russian subject, residing at Sevenoaks, in the county of Kent, England, have invented certain new and useful Improvements in Silencers for Internal-Combustion Engines, of which the following is a specification.

This invention is for improvements in or relating to silencers for internal-combustion engines, and has for its object to provide an improved construction thereof which is particularly suitable for use with aero-engines but can be applied to engines of any motor-vehicle.

According to this invention, a silencer for an internal-combustion engine comprises a casing which has a straight axis, has said axis parallel or approximately so to the direction in which the casing passes through the air, receives the exhaust gases from the engine directly, *i. e.* without the use of any intervening silencing device, and has its after-body so shaped as to deflect the air-streams along the outside of the casing outward all around it so that they diverge as they pass the outlet for the exhaust gases at the open after end of the casing, whereby a region of rarefaction is produced behind the said after-end; a perforated diaphragm may be provided if desired across the outlet passage for the purpose of diminishing the noise produced by the exhaust; the leading end of the said casing is preferably provided with an inlet which opens directly from the exterior atmosphere to admit cold air, which opening may itself have a forwardly-directed bell so as to obtain a greater flow of cold air through the casing than would otherwise be obtained.

In a modified construction the silencer may comprise a casing as above described with an air-inlet opening at its forward end, and an inner exhaust-collecting and -discharging conduit, this conduit being tapered or parallel and disposed with its open end terminating within or beyond the casing.

In both of these constructions, the exhaust from the various cylinders of the engine is led directly into the exhaust-receiving-conduit preferably by separate pipes from each cylinder.

According to another feature of the invention, the forward end of the casing may be so shaped as to expand in internal diameter from the cold-air inlet to a point in rear thereof, and from the point of maximum diameter it extends aft, with or without changing in diameter, to a point from which a bell at the after end expands to produce the above-described radial flow of the air-streams along the outside of the casing.

In the accompanying drawings,

Figure 1 is a plan showing a silencer in section as applied to an aero-engine, the aircraft being indicated diagrammatically;

Fig. 2 is a similar view showing a modified construction of silencer.

Like reference characters indicate like parts in both figures.

Referring first to Fig. 1, the body of the aircraft is indicated at 10 with an air-screw at 11. The exhausts from the various cylinders of the engine are led out by separate pipes 20 which open at their outer ends into a casing 21. The pipes 20 project into the casing 21 and their open ends 22 are cut off at an angle so that the openings are directed aft. The forward end of the casing 21 is open at 23 and it may be provided with a flared or bell-shaped portion 24 directed forwardly. The passage of the machine through the air causes a flow of cold air to enter at 23 and pass through the interior of the casing 21 mixing with the exhaust gases which are delivered from the pipes 20 thereto.

The after-end of the casing 21 is so shaped as to cause an outward flow of the air-stream along the outside of the casing, and as illustrated in Fig. 1, this effect is obtained by a rearwardly extending cone or bell-shaped portion 25 which is open at its after-end. The said outward flow of the surrounding air produces a diminution of pressure in the neighborhood of the after-end, and the outflow of the exhaust gases is thereby facilitated, with a consequent increase in engine efficiency.

It will be seen that this construction of a silencer produces a very effective cooling of the exhaust gases owing to their admixture with cold air, and also owing to the loss of heat by the exhaust gases through the wall of the casing 21. The result is that the said exhaust gases are much reduced in volume and pressure, and this together with the suction effects produced by the bell 25 at the outlet for the exhaust gases, diminishes to a very considerable extent, if not entirely, the noise of the exhaust. If it is desired, a perforated diaphragm may be provided at or near the outlet to further assist in diminishing the noise.

In the construction illustrated in Fig. 2, the individual exhaust pipes 20 from the engine cylinders are led through a casing 30 and into an inner conduit 31. This conduit is a close fit around the foremost pipe 20 and expands rearwardly, where it discharges the exhaust gases. The increasing diameter of this conduit is provided in order to allow for the greater volume of exhaust gases dealt with at the after-end. The outer casing 30 is open at its forward end 32, where it may be provided with a forwardly-directed bell similar to the bell 24 in Fig. 1 if so desired, and from this opening 32 it expands rearwardly to a point 33 which is the maximum diameter of the casing. From this point 33, it extends farther aft, preferably diminishing in diameter but not necessarily so, to a point 34 from which a flared or bell-shaped portion 35 extends aft and outwardly. This portion 35 serves to produce the above-mentioned outward flow of the air-stream surrounding the casing, which outward flow produces a region of rarefaction at the after-end of the casing 30.

The cold air entering at 32 passes through the casing 30 around the inner conduit 31, thereby cooling the exhaust gases. The cold air mixes with the gases when they emerge from the after-end 36 of the conduit 31 and subsequently passes out of atmosphere through the bell 35.

In this case also, a perforated diaphragm 37 may be provided across the outlet from the silencer if so desired, or the diaphragm might be situated at the outlet 36 from the inner conduit 31.

What I claim as my invention and desire to secure by Letters Patent is:—

1. In a silencer for an internal-combustion engine, the combination of a casing which has a straight axis substantially parallel with the direction of relative movement between the casing and the air, and which is open at its after end and which has its after-body so shaped as to deflect the air streams along the outside of the casing outward all around it, so that they diverge as they pass the said open after end, and a plurality of direct separate pipe connections through the casing providing direct communication for the exhaust gases from the engine to the interior of the casing from each separate pipe in a plane passing through the axis of said casing.

2. In a silencer for an internal-combustion engine, the combination of, a casing which has a straight axis substantially parallel with the direction of relative movement between the casing and the air, and which is open at its after-end and which has its after body so shaped as to deflect the air streams along the outside of the casing outward all around it, so that they diverge as they pass the said open after end, a perforated diaphragm situated in said open after end, and a plurality of direct separate pipe connections through the casing providing direct communication for the exhaust gases from the engine to the interior of the casing from each separate pipe in a plane passing through the axis of said casing and at a substantial angle with respect to the center line of said casing.

3. In a silencer for an internal-combustion engine, the combination of a casing which has its axis substantially parallel with the direction of relative movement between the casing and the air, and which is open at its forward-end and at its after end, and which has its after body so shaped as to deflect the air streams along the outside of the casing outward all around it so that they diverge as they pass the said open after-end, a bell communicating with the said open forward end of the casing, an inner casing, and a plurality of direct separate pipe connections through the casing providing direct communication for the exhaust gases from the engine to the interior of the inner casing from each separate pipe in a plane passing through the axis of said casing.

4. In a silencer for an internal-combustion engine, the combination of, a casing which has a straight axis substantially parallel with the direction of relative movement between the casing and the air, and which is open at its forward end and at its after end, and which has its after body so shaped as to deflect the air streams along the outside of the casing outward all around it so that they diverge as they pass the said open after-end, an inner exhaust-collecting and discharging conduit situated within said casing and increasing in diameter rearwardly, and a plurality of direct pipe connections providing communication for the exhaust gases from the engine to said inner conduit.

5. In a silencer for an internal-combustion engine the combination of a casing which has a straight axis substantially parallel with the direction of relative movement between the casing and the air, and which is open at its forward end, and at its after end, and which is so shaped as to expand in internal diameter from the said open forward end to a point in the rear thereof, and which has a rearwardly-directed bell at the said open after end, and a plurality of direct pipe connections providing communication for the exhaust gases from the engine to the interior of the casing at substantially right angles to the axis of said casing.

6. In a silencer for an internal-combustion engine the combination of a casing which has a straight axis substantially parallel with the direction of relative movement between the casing and the air, and which is open at its forward end, and which expands in internal diameter from said open forward end to a point in the rear thereof and which diminishes in external diameter from said point to a point nearer the after end thereof, and which has a rearwardly-directed bell at the after end, an inner exhaust-collecting and discharging conduit situated within said casing, said conduit increasing in diameter from its forward end to its after end, and pipe-connections providing direct communication for the exhaust gases from each cylinder of the engine to the said inner conduit.

In testimony whereof I affix my signature.

SERGE VINCENT DE BOLOTOFF.